United States Patent
Yang et al.

(10) Patent No.: US 7,621,677 B2
(45) Date of Patent: Nov. 24, 2009

(54) OPTICAL COUPLER FOR A LIGHT EMITTING DEVICE WITH ENHANCED OUTPUT BRIGHTNESS

(75) Inventors: Yi Yang, Shenzhen (CN); Li Xu, Saratoga, CA (US); Yi Li, Pleaantan, CA (US)

(73) Assignee: YLX Corp., San Jose, CA (US)

( * ) Notice: Subject to any disclaimer, the term of this patent is extended or adjusted under 35 U.S.C. 154(b) by 0 days.

(21) Appl. No.: 11/842,944

(22) Filed: Aug. 21, 2007

(65) Prior Publication Data
US 2009/0052833 A1    Feb. 26, 2009

(51) Int. Cl.
*G02B 6/36* (2006.01)
*F21V 7/04* (2006.01)
*H01L 33/00* (2006.01)

(52) U.S. Cl. .................. 385/88; 362/553; 362/555
(58) Field of Classification Search .......... 362/553–556
See application file for complete search history.

(56) References Cited

U.S. PATENT DOCUMENTS

| | | | | |
|---|---|---|---|---|
| 4,191,446 A | * | 3/1980 | Arditty et al. | 385/42 |
| 5,024,505 A | * | 6/1991 | Fujikawa et al. | 385/97 |
| 5,914,976 A | * | 6/1999 | Jayaraman et al. | 372/50.21 |
| 5,963,701 A | * | 10/1999 | Nakamura et al. | 385/143 |
| 5,999,678 A | * | 12/1999 | Murphy-Chutorian et al. | 385/117 |
| 6,091,547 A | | 7/2000 | Gardiner et al. | |
| 6,094,517 A | * | 7/2000 | Yuuki | 385/43 |
| 6,826,336 B2 | | 11/2004 | Guy | |
| 2004/0008952 A1 | * | 1/2004 | Kragl | 385/88 |
| 2006/0067078 A1 | | 3/2006 | Beeson et al. | |

FOREIGN PATENT DOCUMENTS

JP          02262606 A   * 10/1990
WO     2006/102846 A1     10/2006

OTHER PUBLICATIONS

International Search Report and Written Opinion in counterpart PCT application No. PCT/US08/070772, dated Sep. 4, 2008.
Chaves, et al. "Luminance enhancement of LED light sources for entendue-limited applications", Proc. of SPIE, vol. 6388, pp. 63380L-1-10.

* cited by examiner

*Primary Examiner*—Uyen Chau N Le
*Assistant Examiner*—Chris H Chu
(74) *Attorney, Agent, or Firm*—Chen Yoshimura LLP

(57) ABSTRACT

A light source is described where the light emitted by a solid-state light emitting device such as an LED is coupled into an optical waveguide such as an optical fiber. A highly reflective coupler (reflector) is disposed around the LED and a segment of the waveguide adjacent the LED. Light emitted from the LED that falls outside of the numerical aperture of the waveguide leaks out of the waveguide, but is reflected back to the waveguide by the reflector. The reflected light is re-reflected or scattered by the LED or the substrate the LED is mounted on, and the re-reflected or scattered light that falls within the numerical aperture of the waveguide is coupled into the waveguide. As a result, light coupling efficiency is increased and the output brightness of the light at the other end of the fiber is enhanced.

23 Claims, 5 Drawing Sheets

OPTICAL COUPLER FOR A LIGHT EMITTING DEVICE WITH ENHANCED OUTPUT BRIGHTNESS

BACKGROUND OF THE INVENTION

1. Field of the Invention

This invention relates to light sources, and in particular, it relates to light sources using solid state light emitting devices.

2. Description of the Related Art

Solid state light sources, such as light emitting diodes (LEDs), exhibit longer lifetimes, lower power consumption, manageable wavelengths and other benefits in comparison with traditional light sources such as high-pressure mercury lamps, Xenon lamps or metal halide lamps. These solid-state light sources increasingly become the alternative or even preferred choice of light sources for a variety of applications, including image projection such as rear projection TV (RPTV) or front projector, headlights or illumination lights for transportation vehicles such as automobiles, motorcycles, boats and airplanes, etc. One import requirement for a light source is to provide high brightness and high power output at the same time.

Figure 1:
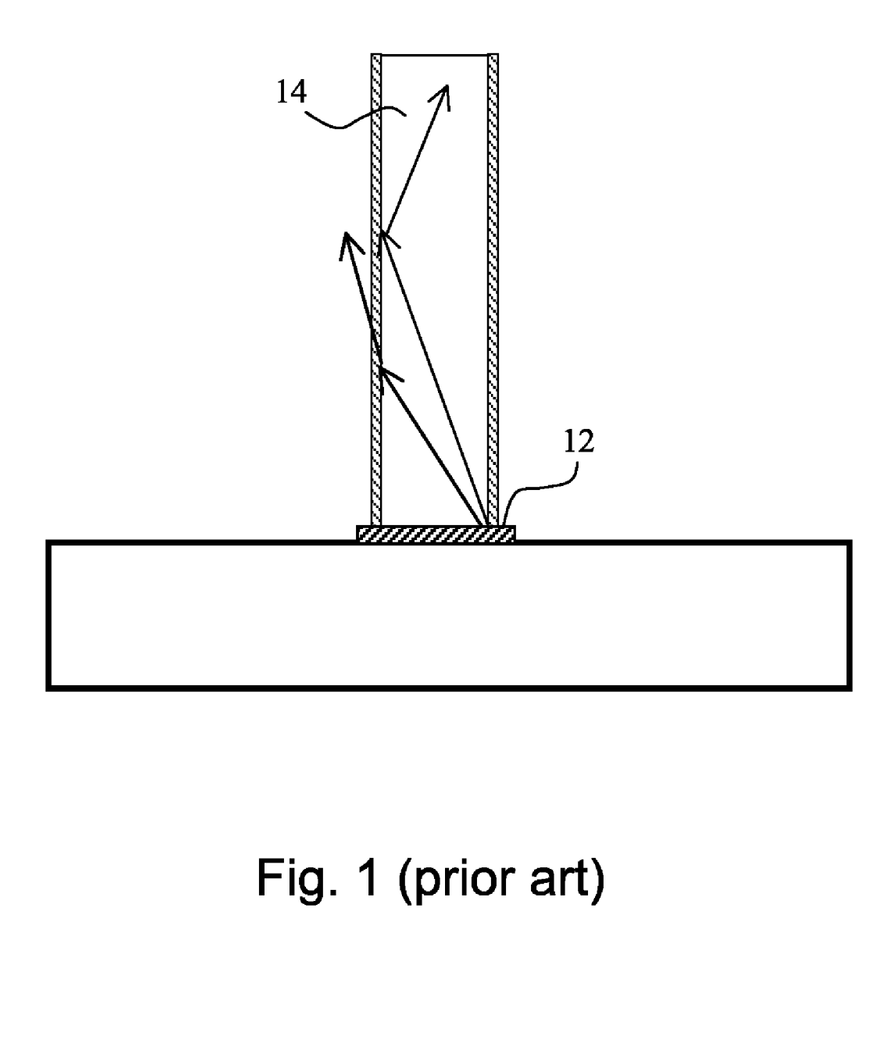
FIG. 1 illustrates a prior art light source where light emitted by a light emitting device is directly coupled into a fiber.

In many applications, the light emitted by the light emitting device such as LED are coupled into a waveguide or optical fiber to be transmitted to a location remote from the light emitting device. The brightness and power output of a light source are often limited by the light coupling efficiency in which light from the light emitting devices such as LEDs into the waveguide or optical fiber. In one conventional device, illustrated in FIG. 1, light from an LED chip 12 is coupled into a fiber 14 by putting the fiber end surface directly on top of the LED. An LED typically emit in all directions. Using the coupling structure shown in FIG. 1, LED light emitted at an angle that is outside the numerical aperture of the fiber will be lost permanently. Thus, for example, if the numerical aperture (NA) of the fiber is about 0.5, the coupling efficiency will be about 25% ($NA^2$).

SUMMARY OF THE INVENTION

The present invention is directed to a light source that substantially obviates one or more of the problems due to limitations and disadvantages of the related art.

An object of the present invention is to provide a light source with enhanced output brightness.

Another object of the present invention is to provide a coupling apparatus and method for collecting light from a light emitting device with increased light coupling efficiency.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a light source which includes: a substrate; a light emitting device disposed on the substrate for emitting a light; a waveguide disposed above and adjacent the light emitting device for collecting the light emitted by the light emitting device; a reflector disposed around a segment of the waveguide adjacent the light emitting device; and one or more optical media disposed in a space between the substrate, the waveguide and the reflector, wherein the waveguide has a refractive index higher than a refractive index of the one or more optical media.

In another aspect, the present invention provides coupling device for collecting light from a light emitting device, which includes: a waveguide disposed above and adjacent the light emitting device for collecting the light emitted by the light emitting device; a reflector disposed around a segment of the waveguide adjacent the light emitting device; and one or more optical media disposed in a space between the waveguide and the reflector, wherein the waveguide has a refractive index higher than a refractive index of the one or more optical media.

In yet another aspect, the present invention provides a method for coupling light emitted by a light emitting device into a waveguide, which includes the steps of: positioning an end surface of the waveguide adjacent the light emitting device to receive light emitted by the light emitting device; and providing a reflector around a segment of the waveguide adjacent the light emitting device to reflect light leaking out of the segment of the waveguide back to the waveguide.

It is to be understood that both the foregoing general description and the following detailed description are exemplary and explanatory and are intended to provide further explanation of the invention as claimed.

DETAILED DESCRIPTION OF THE PREFERRED EMBODIMENTS

Embodiments of the present invention provide a light source where the light emitted by a light emitting device is coupled into an optical waveguide. It employs a highly reflective coupler (reflector) which helps to recycle the light from the light emitting device that falls outside of the numerical aperture of the waveguide back to the light emitting device, thereby increasing the coupling efficiency and enhancing the output brightness of the light source. The light emitting device may be a light emitting diode (LED), a laser diode, or other solid-state light emitting devices. The light emitting device may also be a wavelength conversion material such as a phosphor that converts a shorter wavelength light to a longer wavelength light, or any other suitable device that emits light. An LED is used as an example in the embodiments shown in FIGS. 2a-5.

Figures 2A, 2B:
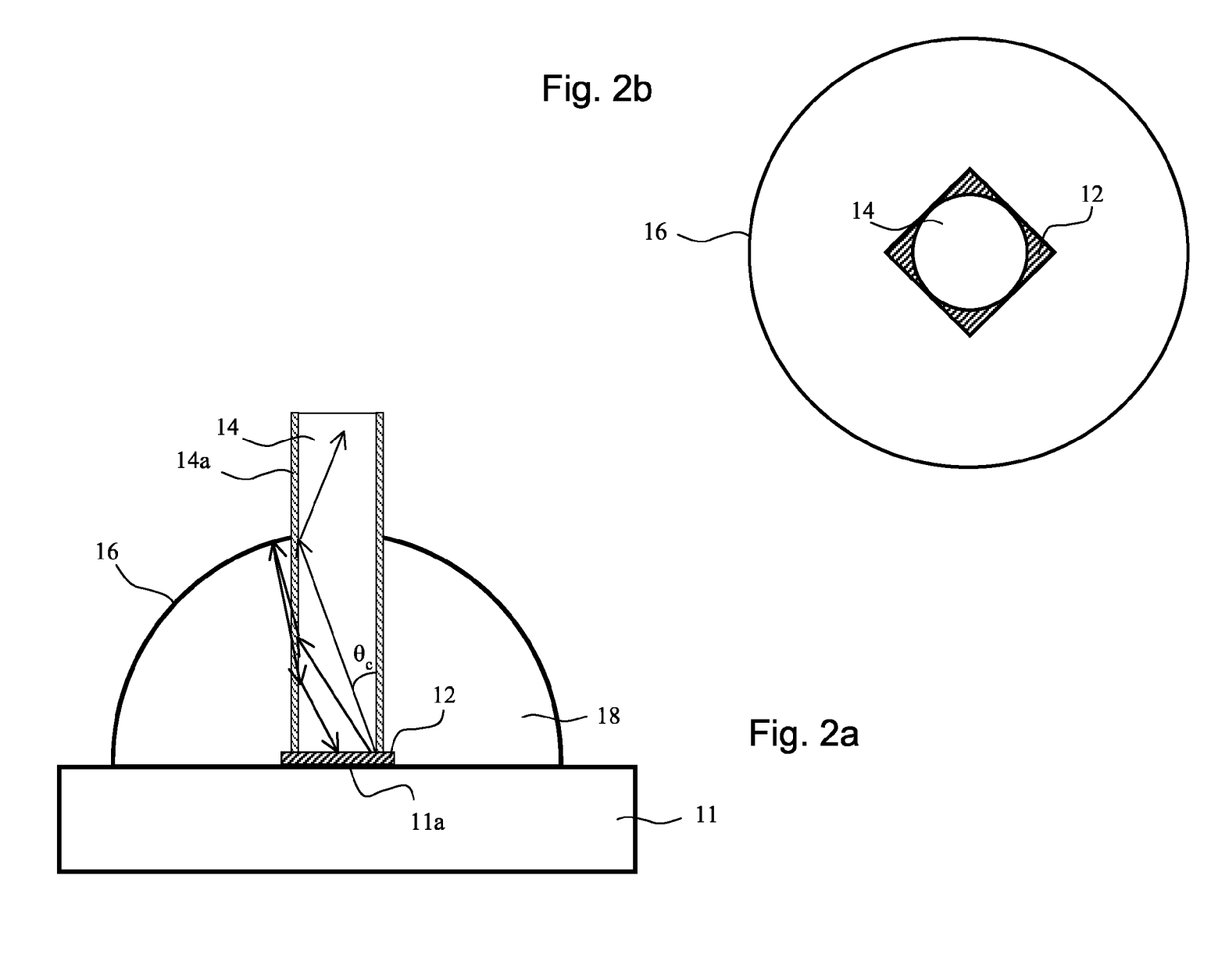
FIGS. 2a and 2b illustrate a light source employing a reflective coupling device for coupling light from a light emitting device into a waveguide according to a first embodiment of the present invention.

In a first embodiment of the present invention illustrated in FIGS. 2a and 2b, an LED chip 12 is mounted on a substrate 11. A highly reflective layer 11a (having a reflectivity of, for example, 50% or higher for the light emitted by the LED) may be provided underneath the active region of the LED. The reflective layer 11a may be formed of a metal coating. Alternatively, or in addition, the surface of the LED 12 may be a roughed surface to reflect and scatter light. An optical fiber 14 is disposed on the LED 12, either directly with the end surface of the fiber contacting the LED surface, or with an air gap in between as described in more detail later. A reflector 16 with a curved, highly reflective surface surrounds the LED 12 and a section of the fiber 14 adjacent the LED. An optical medium 18 such as a gel is filled in the space enclosed by the reflector 16, the fiber 14 and the substrate 11. Preferably, the optical medium 18 is an index matching material having a refractive index approximately equal to that of the fiber cladding 14a, the latter being lower than the refractive index of the fiber core. One example of an index matching material is an index matching gel. FIG. 2b is a top cross-sectional view of the light source showing the LED 12 (partially shown), the fiber 14 and the reflector 16.

As shown in FIG. 2a which is a cross-sectional view in a plane through the center axis of the fiber 14, the light emitted by the LED 12 that has an angle falling within the numerical aperture of the fiber 14 is coupled into and travels along the fiber via total internal reflection by the fiber cladding 14a. The light emitted by the LED 12 that falls outside of the numerical aperture of the fiber 14 leaks out of the fiber, is reflected back by the reflector 16, and re-enters the fiber 14. The reflected light strikes the LED 12, and a majority of it is reflected or scattered by the reflective layer 11a under the LED and/or by the roughed surface of the LED back into the fiber 14 at various angles. The reflected light that has an angle falling within the numerical aperture of the fiber 14 is coupled into the fiber, while reflected light that falls outside of the numerical aperture of the fiber leaks out of the fiber and is reflected back by the reflector 16 again. The reflection process may happen many times. Thus, by using the reflector 16, light emitted by the LED 12 that would otherwise leak out of the fiber 14 can be couple into the fiber, thereby increasing the overall coupling efficiency of the light into the fiber. As a result, the brightness of the light at the output end of the fiber 14 is increased.

In a preferred embodiment, the reflector 16 has the shape of a part of an ellipsoid with rotational symmetry around a center axis of the fiber 14. In the side cross-sectional view seen in FIG. 2a, the reflector 16 is a part of an ellipse with its two focal points located at the two points where the outer diameter of the core of the fiber 14 intersects the LED 12. In other words, the effective area of the LED 12 is located between the focal points of the ellipse. A reflector shaped as an ellipsoid or close to an ellipsoid can effectively reflect light leaking out of the fiber back to the fiber. Other shapes, such as a sphere, may also satisfactorily accomplish this purpose, although the coupling efficiency may be somewhat lower. Preferably, the height of the reflector 16 as measured from the substrate, i.e. the height at the location where the fiber 14 passes through the reflector, is such that all light from the LED 12 that leaks out of the fiber 14 is reflected by the reflector. Thus, the optimum height of the reflector 16 is $$H = D^* \tan \theta_c, \quad (1)$$

where D is the diameter of the fiber and $\theta_c$ is the critical angle for total internal reflection at the fiber cladding. $\theta_c$ is determined by $$\theta_c = \sin^{-1}(n_2/n_1) \quad (2)$$

where $n_1$ is the refractive index of the fiber core and $n_2$ is the refractive index of the fiber cladding. If the height of the reflector 16 is less than H, some light will leak out of the fiber above the reflector and will not be reflected by the reflector, resulting in reduced light coupling efficiency. The height of the reflector 16 can be greater than H without adversely impacting the coupling efficiency, but this will unnecessarily increase the overall size of the coupling devise.

In one particular example, the optical fiber is a plastic fiber such as a PMMA fiber having a diameter of 1 mm. The core has a refractive index of 1.5 and the cladding has a refractive index of 1.41, which gives a numerical aperture of about 0.5 and an acceptance angle of about 20 degrees ($\theta_c$=70 degrees). The optimum height H of the reflector 16 is about 2.75 mm in this example.

Figures 3A, 3B:
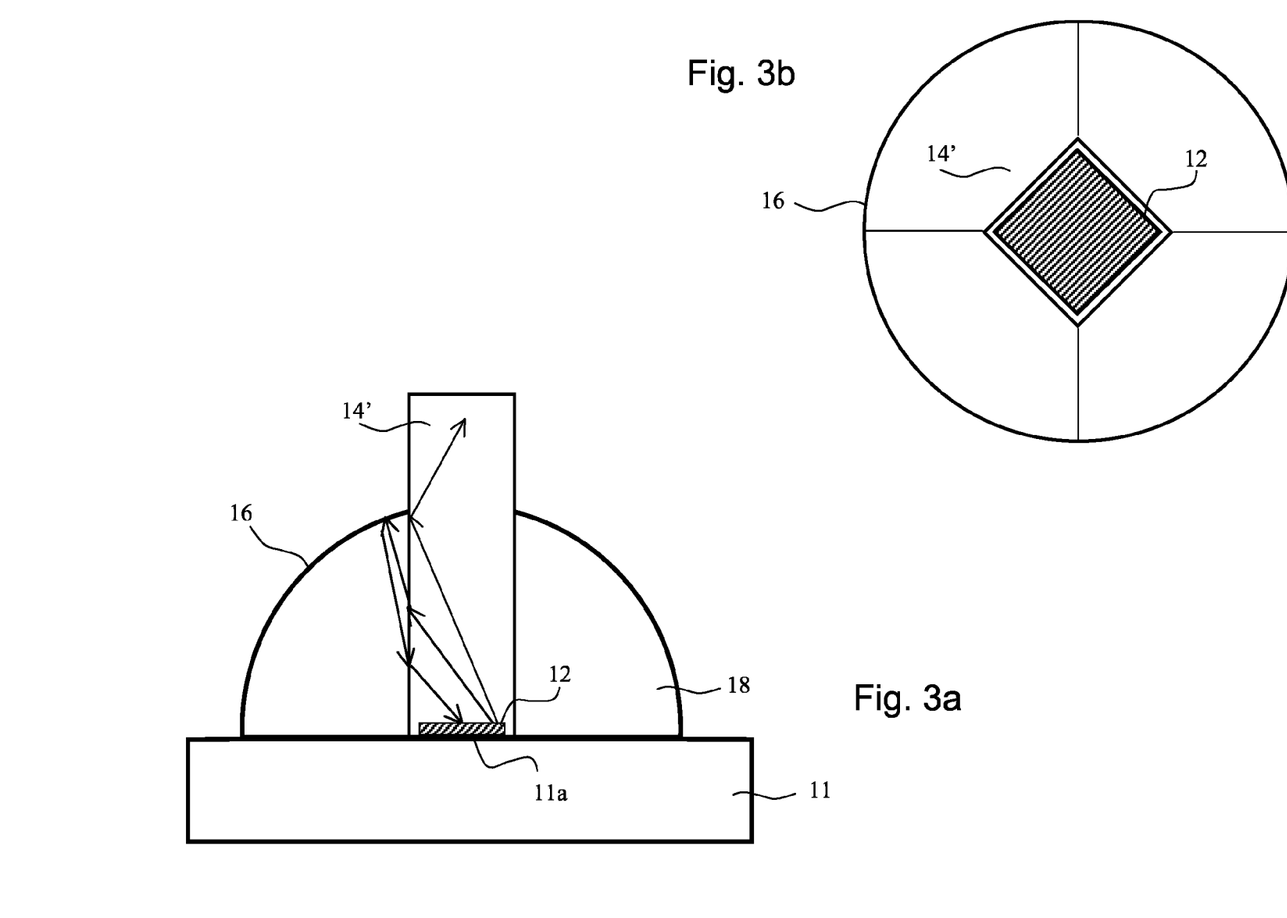
FIGS. 3a and 3b illustrate a light source employing a reflective coupling device for coupling light from a light emitting device into a waveguide according to a second embodiment of the present invention.

FIGS. 3a (side cross-sectional view) and 3b (top cross-sectional view) illustrate a second embodiment of the present invention, which is similar in structure and operation to the first embodiment except that the optical fiber 14 is replaced by a waveguide 14' that does not have a cladding. In the example illustrated in FIGS. 3a and 3b, the waveguide 14' has a square shape matching the shape of the LED 12 and is slightly larger than the LED, but the waveguide may also have other shapes and sizes. As in the first embodiment, an optical medium 18 such as a gel is filled in the space enclosed by the reflector 16, the waveguide 14' and the substrate 11. The optical medium 18 has a refractive index lower than that of the waveguide 14'. In the section of the waveguide 14' above the reflector 16, total internal reflection occurs at the boundary of the waveguide and air. In the section of the waveguide 14' enclosed by the reflector 16, the light from the LED 12 may leak out of the waveguide into the optical medium 18 and be reflected back by the reflector 16. To ensure that no light from the LED 12 leaks out of the waveguide 14' in the section above the reflector 16, the optimum height of the reflector 16 is determined by the same equations (1) and (2) as in the first embodiment except that D now represents the diagonal width of the square waveguide, and that $n_2$=1 because there is no cladding around the waveguide 14' above the reflector 16.

More generally, a light source according to embodiments of the present invention includes a waveguide and one or more optical media disposed between the waveguide and the reflector. The waveguide may be the core of an optical fiber. The optical media may be the cladding of an optical fiber, an optical medium filled in the space between the waveguide and the reflector, or both. The refractive index of the waveguide is higher than that of the optical media. The refractive indices of the waveguide and the optical media may be adjusted to achieve a desired total internal reflection angle. An optical fiber is an example of a waveguide with an optical medium around it. Another example of a waveguide is a glass rod without any cladding. The space between the waveguide and the reflector may also be empty, in which case the optical medium is air or vacuum.

In the embodiments shown in FIGS. 2a and 3a, the waveguide 14 or 14' is directly disposed on top of the LED 12 where the end surface of the waveguide is in contact with the LED. Alternatively, and more preferably, a small air gap is provided between the LED 12 and the end surface of the waveguide 14 or 14'. The size of the air gap is sufficiently small so that significant amount of light does not leak out from the gap. A size between 4 and 150 microns is suitable. The air gap may be accomplished by placing a spacer between the LED 12 and the waveguide 14 or 14'. In one embodiment, a thin cover glass covers the LED and leaves a small air gap between the LED and the glass. An advantage of providing an air gap between the LED 12 and the waveguide 14 or 14' is that light from the LED is refracted upon entering the waveguide form the air gap, so that the angle of the light traveling inside the waveguide is less than a maximum angle with respect to its central axis. For example, if the refractive index of the waveguide is 1.5, the maximum angle is approximately 42 degrees.

Figures 4, 5:
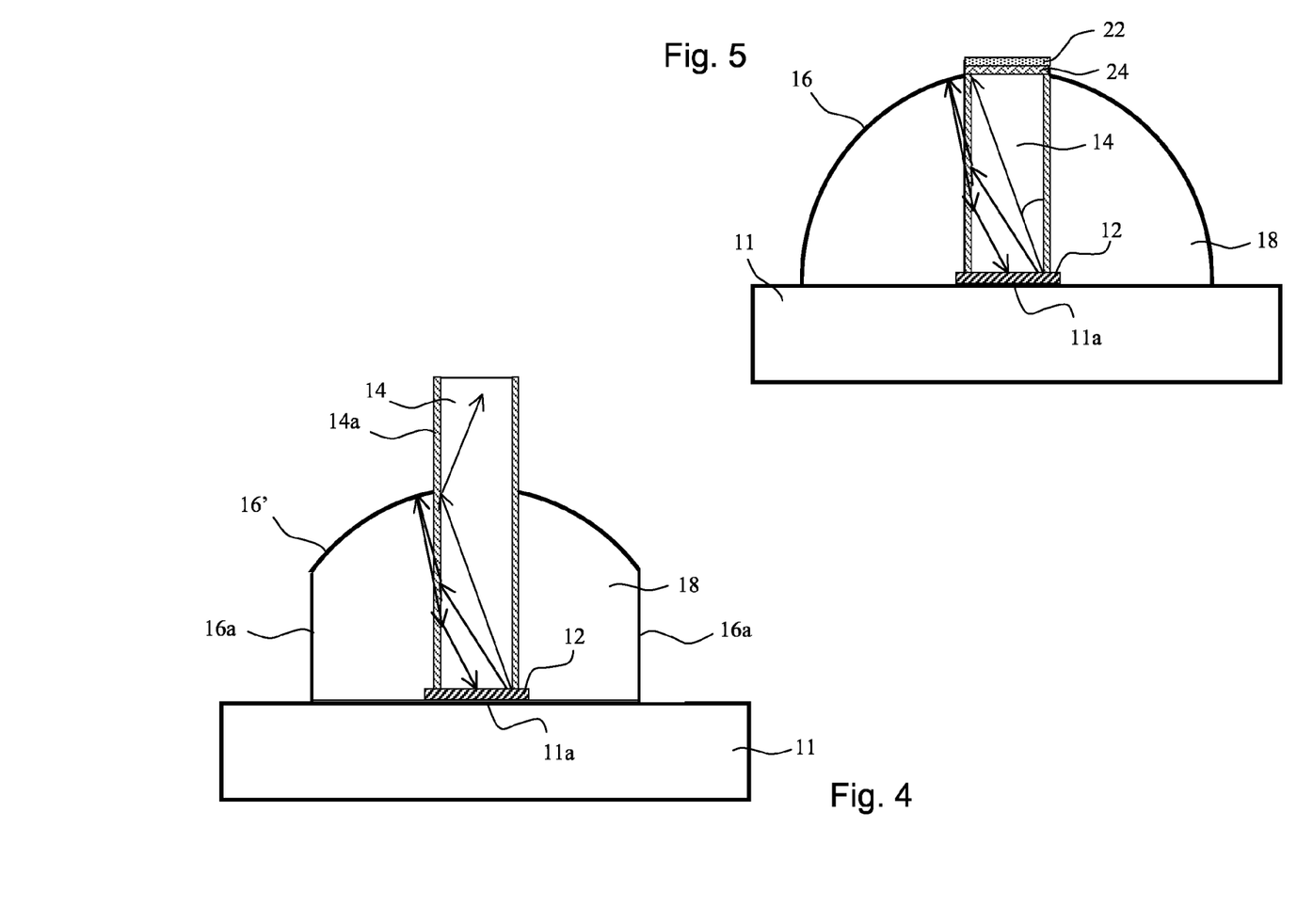
FIG. 4 illustrates a light source employing a reflective coupling device for coupling light from a light emitting device into a waveguide according to a third embodiment of the present invention.
FIG. 5 illustrates a light source employing a light coupling device for coupling light from a light emitting device into a waveguide according to a fourth embodiment of the present invention.

In the embodiments shown in FIGS. 2a and 3a, the ellipsoid-shaped reflector 16 extends to the surface of the substrate 11. Alternatively, the reflector may have the shape of a truncated ellipsoid, as shown in FIG. 4. The reflector 16' shown in FIG. 4 has the same height as the reflector 16 in FIG. 2a, but does not extend down to the substrate surface. Rather, a support structure 16a is disposed between the reflector 16' and the substrate 11 to support the reflector, as well as to form an enclosure to retain the optical medium 18. The support structure 16a shown in FIG. 4 has a cylindrical shape, but other shapes such as a cone shape, etc. may also be used. Other parts of the embodiment of FIG. 4 are similar to those of FIG. 2a. The truncated reflector 16' may be useful when the light traveling inside the waveguide 14 does not have an angle greater than a certain value. As pointed out earlier, when an air gap is provided between the LED 12 and the waveguide 14, the angle of the light traveling inside the waveguide is less than about 42 degrees. Thus, a truncated reflector 16' that reflects light leaked from the fiber 14 at an angle of up to 42 degrees may be suitable in such an application. Compared to the full reflector 16 shown in FIGS. 2a and 3a, the reflector 16' shown in FIG. 4 is easier to make and also reduces the lateral size of the reflector.

The reflector 16 or 16' may be made by forming a highly reflective coating such as an aluminum or silver coating on the inside surface of a preformed shell. To assemble the light source shown in FIG. 2a or 3a, the reflector 16 is placed over the substrate 11 around the waveguide 14 or 14', and an optical medium 18 in the form of a gel is filled in the space between the reflector, the substrate and the waveguide. With appropriate viscosity, the gel can fill this space without penetrating into the air gap between the LED and the waveguide. Optionally, a glass cylinder can be provided around the waveguide to avoid overheating and melting of the waveguide if it is made of a heat sensitive material such as a plastic fiber. A light source shown in FIG. 4 can be similarly assembled by using the support structure 16a to retain the gel 18. Alternatively, the reflector 16 or 16' may be made by forming a highly reflective coating on the curved outside surface of a solid piece of optical material. The solid piece of optical material, which has a center hole where the waveguide is disposed, acts as the optical medium 18 that fills the space between the reflector and the waveguide.

FIG. 5 illustrates another embodiment of the present invention which can couple high brightness polarized light into a waveguide. This embodiment is similar to the first embodiment shown in FIG. 2a except for the addition of a reflective polarizer 22 and a quarter wave plate 24 (optional). The reflective polarizer 22 and quarter wave-plate 24 are placed at the output end of the optical fiber 14 beyond the output aperture of the reflector 16 where the optical fiber passes through the reflector. In FIG. 5, the fiber 14 is shown to extend only slightly above the output aperture of the reflector 16, but the fiber 14 can also extend well beyond the output aperture of the reflector 16 and the reflective polarizer 22 and quarter wave-plate 24 can be located remotely from the light emitting device 12 and the reflector 16. Using the reflective polarizer 22, light of desired polarizations in the fiber 14 can be transmit through the polarizer to exit the fiber, and the light of other polarizations is reflected back along the fiber toward the LED 12. The reflected light strikes the LED 12, and a majority of it is reflected or scattered by the reflective layer 11a under the LED and/or the roughed surface of the LED back into the fiber 14 at various polarizations. Some of the reflected light has the desired polarization and is transmitted through the reflective polarizer 22, and other light is reflected back. The reflection process may happen many times. To further increase the output efficiency, a quarter wave-plate 24 may be placed before the polarizer 22. The polarized light outputted by the fiber 14 is useful in various applications such as illumination of LCD and LCoS in a display device.

Figure 6:
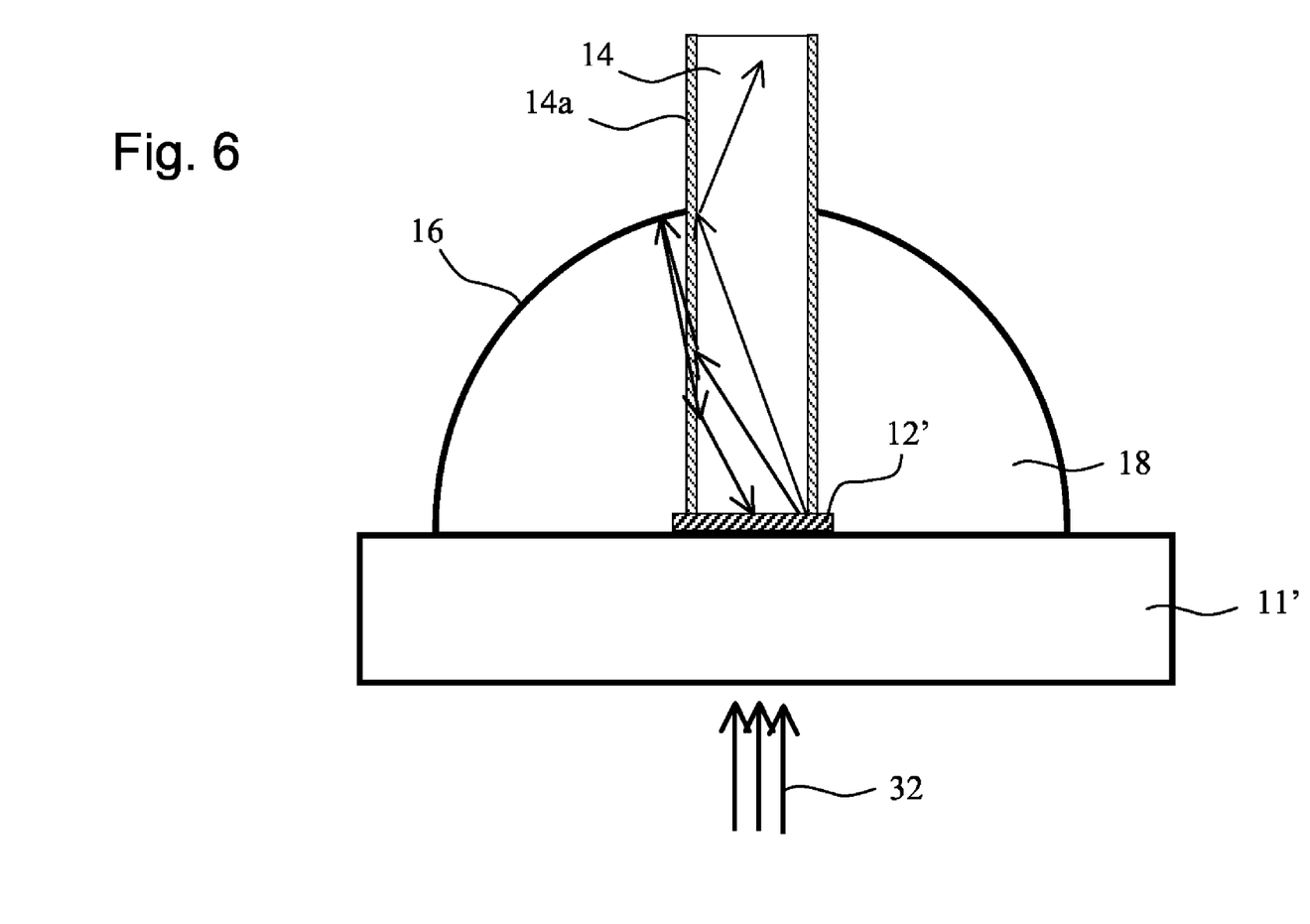
FIG. 6 illustrates a light source employing a light coupling device for coupling light from a light emitting device into a waveguide according to a fifth embodiment of the present invention.

In the embodiments shown in FIGS. 2a-5, an LED is used as an example of a light emitting device 12. FIG. 6 illustrates another embodiment of the present invention in which the light emitting device is a wavelength conversion material 12' that is capable of absorbing an excitation light of a first wavelength and emitting a converted light of a second wavelength longer than the first wavelength. The wavelength conversion material 12' may be, for example, phosphor materials or nano-materials such as quantum dots. The substrate 11' on which the wavelength conversion material 12' is disposed preferably includes a dichroic filter under the wavelength conversion material 12' which transmits the excitation light and reflects the converted light. For example, the substrate 11' may be a transparent plate with a dielectric coating either on the entire plate or in the area under the wavelength conversion material 12'. The excitation light 32 is introduced onto the wavelength conversion material 12' from the side of the substrate 11' opposite the reflector 16. The excitation light 32 may be delivered by an optical fiber, coupling optics, or directly from an excitation light source such as an LED (not shown in FIG. 6). The fiber 14 and the wavelength conversion material 12' may be in direct contact, or have a gap in between filled with an index matching gel or air. The other parts of the embodiment of FIG. 6 are similar in structure and function to those of the embodiment of FIG. 2a, and detailed descriptions of them are omitted here.

It will be apparent to those skilled in the art that various modification and variations can be made in the light source and the optical coupler for the light source of the present invention without departing from the spirit or scope of the invention. Thus, it is intended that the present invention cover modifications and variations that come within the scope of the appended claims and their equivalents.

What is claimed is:

1. A light source comprising:
    a substrate;
    a light emitting device disposed on the substrate for emitting a light;
    a waveguide disposed above and adjacent the light emitting device for collecting the light emitted by the light emitting device;
    a reflector disposed around a segment of the waveguide adjacent the light emitting device to reflect light striking on it back toward the light emitting device; and
    one or more optical media disposed in a space between the substrate, the waveguide and the reflector,
    wherein the waveguide has a refractive index higher than a refractive index of the one or more optical media, and
    wherein the light emitting device has a reflecting or scattering surface facing the waveguide for reflecting or scattering light striking on it back at various angles.

2. The light source of claim 1, wherein the light emitting device is a light emitting diode.

3. The light source of claim 2, wherein the reflecting or scarring surface is a reflective layer on the substrate.

4. The light source of claim 1, wherein the waveguide and the light emitting device define an air gap therebetween.

5. The light source of claim 1, wherein the waveguide is a core of an optical fiber and the one or more optical media include a cladding of the optical fiber.

6. The light source of claim 5, wherein the one or more optical media further include an index matching gel filling the space between the substrate, the waveguide and the reflector.

7. The light source of claim 1, wherein the waveguide has a square cross-sectional shape matching a shape of the light emitting device.

8. The light source of claim 1, further comprising a support structure disposed between the reflector and the substrate for supporting the reflector and for enclosing the one or more optical media.

9. The light source of claim 1, further comprising a reflective polarizer disposed at an output end of the waveguide located beyond an output aperture of the reflector where the waveguide passes through the reflector.

10. The light source of claim 1, further comprising a waveplate disposed before the reflective polarizer at the output end of the waveguide.

11. A light source comprising:
a substrate;
a light emitting device disposed on the substrate for emitting a light;
a waveguide disposed above and adjacent the light emitting device for collecting the light emitted by the light emitting device;
a reflector disposed around a segment of the waveguide adjacent the light emitting device; and
one or more optical media disposed in a space between the substrate, the waveguide and the reflector,
wherein the waveguide has a refractive index higher than a refractive index of the one or more optical media, and
wherein the light emitting device is a wavelength conversion material capable of absorbing an excitation light of a first wavelength and emitting a converted light of a second wavelength longer than the first wavelength, wherein the substrate includes a dichroic filter under the wavelength conversion material that transmits the excitation light and reflects the converted light.

12. The light source of claim 11, further comprising a source of the excitation light disposed on a side of the substrate opposite the reflector.

13. A light source comprising:
a substrate;
a light emitting device disposed on the substrate for emitting a light;
a waveguide disposed above and adjacent the light emitting device for collecting the light emitted by the light emitting device;
a reflector disposed around a segment of the waveguide adjacent the light emitting device; and
one or more optical media disposed in a space between the substrate, the waveguide and the reflector,
wherein the waveguide has a refractive index higher than a refractive index of the one or more optical media, and
wherein the one or more optical media include a gel filling the space between the substrate, the waveguide and the reflector.

14. A light source comprising:
a substrate;
a light emitting device disposed on the substrate for emitting a light;
a waveguide disposed above and adjacent the light emitting device for collecting the light emitted by the light emitting device;
a reflector disposed around a segment of the waveguide adjacent the light emitting device; and
one or more optical media disposed in a space between the substrate, the waveguide and the reflector,
wherein the waveguide has a refractive index higher than a refractive index of the one or more optical media, and
wherein the optical media include air.

15. A light source comprising:
a substrate;
a light emitting device disposed on the substrate for emitting a light;
a waveguide disposed above and adjacent the light emitting device for collecting the light emitted by the light emitting device;
a reflector disposed around a segment of the waveguide adjacent the light emitting device; and
one or more optical media disposed in a space between the substrate, the waveguide and the reflector,
wherein the waveguide has a refractive index higher than a refractive index of the one or more optical media, and
wherein the reflector has a shape of a part of an ellipsoid.

16. The light source of claim 15, wherein a cross-sectional shape of the reflector in a plane through a center axis of the waveguide is a part of an ellipse, and wherein the light emitting device is located between two focal points of the ellipse.

17. A light source comprising:
a substrate;
a light emitting device disposed on the substrate for emitting a light;
a waveguide disposed above and adjacent the light emitting device for collecting the light emitted by the light emitting device;
a reflector disposed around a segment of the waveguide adjacent the light emitting device; and
one or more optical media disposed in a space between the substrate, the waveguide and the reflector,
wherein the waveguide has a refractive index higher than a refractive index of the one or more optical media, and
wherein the reflector has a height determined by a size of the waveguide, a refractive index of the waveguide, and a refractive index of any optical medium surrounding the waveguide above the reflector.

18. A coupling device for collecting light from a light emitting device, comprising:
a waveguide disposed above and adjacent the light emitting device for collecting the light emitted by the light emitting device;
a reflector disposed around a segment of the waveguide adjacent the light emitting device to reflect light striking on it back toward the light emitting device;
one or more optical media disposed in a space between the waveguide and the reflector,
wherein the waveguide has a refractive index higher than a refractive index of the one or more optical media; and
a reflecting or scattering surface located adjacent or on the light emitting device facing the waveguide for reflecting or scattering light striking on it back at various angles.

19. A method for coupling light emitted by a light emitting device into a waveguide, comprising:
  positioning an end surface of the waveguide adjacent the light emitting device to receive light emitted by the light emitting device;
  providing a reflector around a segment of the waveguide adjacent the light emitting device to reflect light leaking out of the segment of the waveguide back to the waveguide toward the light emitting device, and
  providing a reflecting or scattering surface located adjacent or on the light emitting device facing the waveguide to reflect or scatter the light striking on it back at various angles.

20. The method of claim 19, further comprising:
  providing an optical medium between the segment of the waveguide and the reflector.

21. The method of claim 19, wherein the end surface of the waveguide is disposed adjacent the light emitting device with an air gap in between.

22. The method of claim 19, further providing:
  providing a reflective polarizer at an output end of the waveguide to transmit light of desired polarizations and reflect light of other polarizations.

23. A light source comprising:
  a substrate;
  a light emitting diode disposed on the substrate for emitting a light;
  a waveguide disposed above and adjacent the light emitting device for collecting the light emitted by the light emitting device;
  a reflector disposed around a segment of the waveguide adjacent the light emitting device; and
  one or more optical media disposed in a space between the substrate, the waveguide and the reflector,
  wherein the waveguide has a refractive index higher than a refractive index of the one or more optical media, and
  wherein the light emitting diode has a rough surface facing the waveguide which reflects or scatters light striking on it back at various angles.

* * * * *